US010534716B2

(12) United States Patent
Jannyavula Venkata et al.

(10) Patent No.: US 10,534,716 B2
(45) Date of Patent: Jan. 14, 2020

(54) LIMITING ACCESS OPERATIONS IN A DATA STORAGE DEVICE

(71) Applicant: Seagate Technology LLC, Cupertino, CA (US)

(72) Inventors: Sumanth Jannyavula Venkata, Chanhassen, MN (US); Mark A. Gaertner, Vadnais Heights, MN (US); Jonathan G. Backman, Eagan, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 51 days.

(21) Appl. No.: 15/209,584

(22) Filed: Jul. 13, 2016

(65) Prior Publication Data

US 2018/0018269 A1 Jan. 18, 2018

(51) Int. Cl.
*G06F 12/0888* (2016.01)
*G06F 12/0868* (2016.01)
*G06F 12/02* (2006.01)

(52) U.S. Cl.
CPC ...... *G06F 12/0888* (2013.01); *G06F 12/0868* (2013.01); *G06F 12/0253* (2013.01); *G06F 2212/1008* (2013.01); *G06F 2212/1036* (2013.01); *G06F 2212/222* (2013.01); *G06F 2212/281* (2013.01); *G06F 2212/313* (2013.01)

(58) Field of Classification Search
CPC .. G06F 3/061; G06F 12/0253; G06F 12/0871; G06F 19/3431; G06F 2212/6042; G06F 2212/621; G06F 3/0619; G06F 3/065; G06F 3/0653; G06F 3/0688; G06F 9/5077; G06F 2212/1036; G06F 12/0868; G06F 12/0888; G06F 2212/1008; G06F 2212/281; G06F 2212/313; G06F 2212/702; G06F 2212/222; G11C 11/2275; G11C 11/2293
USPC .......................................................... 711/138
See application file for complete search history.

(56) References Cited

U.S. PATENT DOCUMENTS 8,010,738 B1 * 8/2011 Chilton ................ G11C 16/349 711/103
8,639,872 B1 1/2014 Boyle et al.
9,280,466 B2 3/2016 Kunimatsu et al.
2007/0162693 A1 7/2007 Nam
2009/0300277 A1 * 12/2009 Jeddeloh ............. G06F 12/0246 711/104
2013/0275672 A1 10/2013 Bert
2013/0346672 A1 * 12/2013 Sengupta ............ G06F 12/0871 711/103
2014/0032817 A1 * 1/2014 Bux .................... G06F 12/0246 711/103
2014/0181369 A1 6/2014 Horn
(Continued)

*Primary Examiner* — Hashem Farrokh
(74) *Attorney, Agent, or Firm* — Holzer Patel Drennan

(57) ABSTRACT

A hybrid data storage device disclosed herein includes a main data store, one or more data storage caches, and a data storage cache management sub-system. The hybrid data storage device is configured to limit write operations on the one or more data storage caches to less than an endurance value for the data storage cache. In one implementation, the data storage cache management sub-system limits or denies requests for promotion of data from the main data store to the one or more data storage caches. In another implementation, the data storage cache management sub-system limits garbage collection operations on the data storage cache.

18 Claims, 6 Drawing Sheets

500
502 Initiate Garbage Collection Operation
504 Determine Garbage Collection Unit Write Amplification Limit
506 Determine Expected Write Amplification for the Garbage Collection Operation
508 Is Write Amplification for Garbage Collection Operation > Write Amplification Limit?
Y
N
510 Complete Garbage Collection for Current Garbage Collection Unit
512 Is Current Garbage Collection Unit the Last Garbage Collection Unit?
Y
N
514 Proceed to Next Garbage Collection Unit
516 Limit Migrations of Valid Data in Current Garbage Collection Unit to Less Than Write Amplification Limit
518 End Garbage Collection Operation

(56) References Cited

U.S. PATENT DOCUMENTS

| | | | | |
|---|---|---|---|---|
| 2014/0244918 | A1* | 8/2014 | Maheshwari | G06F 12/0866 711/103 |
| 2015/0058525 | A1 | 2/2015 | Venkata | |
| 2015/0149730 | A1 | 5/2015 | Hu et al. | |
| 2016/0041902 | A1 | 2/2016 | Atkisson et al. | |
| 2016/0077968 | A1 | 3/2016 | Sela et al. | |
| 2016/0188460 | A1* | 6/2016 | Kanno | G06F 12/0246 711/103 |
| 2016/0217071 | A1* | 7/2016 | Hu | G06F 12/0246 |
| 2016/0371186 | A1 | 12/2016 | Shetty et al. | |
| 2016/0378655 | A1* | 12/2016 | Blagodurov | G06F 12/0811 711/122 |

* cited by examiner

LIMITING ACCESS OPERATIONS IN A DATA STORAGE DEVICE

BACKGROUND

A hybrid data storage device may combine a conventional hard disk drive (HDD) as a main data store with one or more secondary data caches to improve performance. One or more of the secondary cache components of the hybrid data storage device may be limited to be used as a read cache that receives promotions of data from the main data store and transmits the promoted data in response to requests from a host. An secondary cache component, however, may suffer from endurance limitations relating to the total number of programs and erases that the secondary cache component may be expected to be able to support over the secondary cache component's lifetime before failure. Since hybrid data storage devices may include a manufacturer's warranty for a defined period of time, failure of a secondary cache component due to excessive program/erase or read/write operations may cause the hybrid data storage device to enter a failure mode before the end of the warranty period.

SUMMARY

A data storage device disclosed herein includes a data storage medium including a main store and a flash data storage cache and a flash management sub-system configured to promote clusters of data from the main store to the storage cache, the controller further configured to adjust lifetime program/erase (PE) operations on the storage cache.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
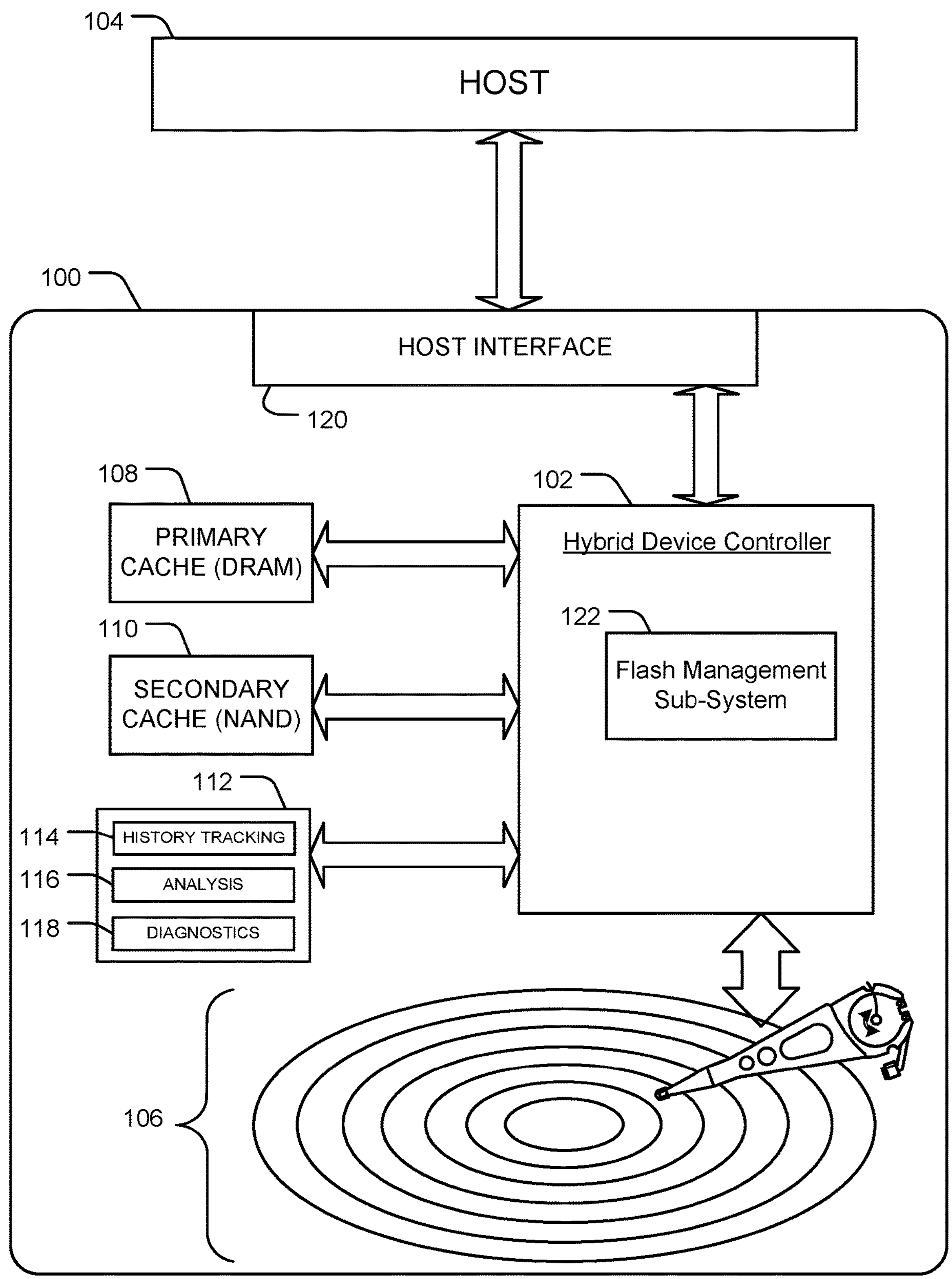
FIG. 1 is a block diagram of an example apparatus for managing program/erase operations in a hybrid data storage device.

The present disclosure includes a system and methods for managing program/erase or read/write operations in a hybrid data storage device. In this disclosure, references to program/erase operations may also refer to read/write operations, depending on the type of storage media. In an implementation, a hybrid data storage device may include a main data store (e.g., rotating magnetic media), a primary cache (e.g., DRAM), and a secondary cache (e.g., NAND flash). The NAND flash secondary cache may include an expected total lifetime program/erase operations that should not be exceeded over the life of the storage device or should not be exceeded over a warranty period for the storage device. In an implementation, an over-provisioning level of the NAND flash read cache may be increased to reduce program/erase operations caused by migration of valid data on the cache such as during garbage collection operations. In another implementation the relative size of over-provisioned space may be increased from typical levels (for example, to 50% of physical space), and blocks of data on the secondary NAND flash cache may be marked as "pending eviction" rather than being invalidated when the read cache receives a promotion from the main store, and actual eviction may be delayed until the point of garbage collection of the block containing the data. Valid data may therefore be held in the read cache longer than it would if it were evicted when the cache receives a new promotion, thus increasing the probability of a hit on the read cache. Marking blocks in the over-provisioned space also effectively increases the useable capacity of the cache since the data in advertised space and the data marked as "pending eviction" in the over-provisioned space may together comprise up to 100% (or approaching 100%) of the physical capacity of the cache because it would no longer be necessary to maintain a fixed list of free (i.e. over-provisioned) space on the cache.

Another implementation may manage program/erase operations on a NAND flash cache by throttling promotions from the main data store. First, an operation may determine an upper limit for program/erase operations in a period of time. In one implementation, a remaining life of the storage device may be divided into time periods, which may be equal time periods, until a stop date, such as an expected end-of-life of the storage device, the end of a warranty period for the storage device, etc. The remaining number of program/erase operations until the read cache reaches a maximum number of lifetime program/erase operations may be divided by the number of remaining time periods to calculate an average number of allowed program/erase operations per time period. If the read cache approaches or reaches the average number of allowed program/erase operations in a current time period, additional promotions from the main data store may be throttled to prevent excessive wear on the NAND flash read cache.

Yet another implementation may manage program/erase operations on a NAND flash read cache by throttling garbage collection operations. Garbage collection operations may require program operations to migrate valid data from a block before erasing the block. If the NAND flash cache is coherent with the main data store (i.e., contains only data that is also present on the main data store), it is possible to skip migration of valid data during garbage collection operations because any skipped data may be retrieved from the main data store if it is needed at a future time. Whether to skip during garbage collection operations may be determined based on an average number of allowed program/erase operations in a current time period or according to other heuristics, such as coldness of the data, least recently used data, etc., as explained in more detail below.

A hybrid data storage device may include a main data store (e.g., rotating magnetic media), a primary cache, and a secondary cache. In an implementation, the primary cache is a smaller, faster storage media, such as dynamic random access memory (DRAM), and the secondary cache is an intermediate, slower data storage media, such as NAND flash. In an implementation, the secondary cache is read cache. The read cache may accept promotions of data from the main data store, and provide the data stored thereon to a host upon request. In another implementation, the secondary cache is a write cache. Throughout this disclosure, descriptions of a read cache are applicable to any secondary cache wherein usage and wear may be controlled, such as any secondary cache with an endurance or expected wear limit.

The number of total lifetime program/erase operations performed on a NAND flash storage media (also termed the "endurance" of the storage media) may be limited to avoid failure, and therefore also failure the hybrid data storage device as a whole. The number of total lifetime program/erase operations that the NAND flash cache may be expected to be able to successfully perform may be provided by a manufacturer or it may be determined from testing for specific use as a read cache. Considerations such as error rate, retention requirements, program/erase failures, bit error rate, operating temperature, etc. may be relied upon to determine and/or modify the endurance of the NAND flash read cache. The hybrid data storage device may be covered by a manufacturer's warranty, and the manufacturer may choose a value for the NAND flash read cache to limit the number of expected failures before the end of the warranty period to an number that is acceptable to the manufacturer.

FIG. 1 is a block diagram of an apparatus for managing program/erase operations in a hybrid data storage device 100. The hybrid data storage device 100 includes a hybrid device controller 102 that communicatively couples the hybrid data storage device 100 to a host 104 via a host interface 120. The hybrid device controller 102 provides a mechanism to allow the host 104 to store to and retrieve data from a main data store 106. In an implementation, the main data store 106 includes rotating magnetic disks. The hybrid device controller 102 may utilize communication interfaces and protocols including SATA, SCSI, eSATA, SAS, USB, etc. The hybrid device controller 102 provides communications between the host 104 and the hybrid data storage device 100. Furthermore, the host interface 120 also abstracts operations of the hybrid device controller 102, at least with respect to the main data store 106, primary cache 108, secondary cache 110, and functional modules 112. For example, the host 104 may access data by reference to logical block addresses (LBAs) that are mapped by the hybrid device controller 102 to physical addresses on the main data store 106 organized according to a different physical addressing scheme, e.g., an addressing scheme based on cylinders, heads, sectors, etc.

The hybrid device controller 102 may store and organize data received from the host in a manner that will improve performance or provide efficient operation with the host 104. The host 104 may send memory access requests to the hybrid data storage device 100 to read or write data via the hybrid device controller 102. The memory access requests may specify a host logical block address (LBA) range used for the operation of the memory access request. For example, a memory access request from the host 104 may include a request that a host LBA range be written to on the hybrid data storage device 100 or that a host LBA range be read from the hybrid data storage device 100. The hybrid device controller 102 further controls data flow between the hybrid device controller 102 and other components of the hybrid data storage device 100 as described herein, such as between a primary cache 108, a secondary cache 110, the main data store 106, modules 112, etc.

The hybrid data storage device 100 may include the primary cache 108 and the secondary cache 110 for storage of data. In an implementation, the primary cache 108 may be a volatile random access memory (RAM) device, such as Dynamic-RAM (DRAM), and the secondary cache 110 may be non-volatile RAM, such as a NAND flash memory. The primary cache 108 and the secondary cache 110 may be used for a variety of reasons, including as temporary or permanent stores of data needed by the hybrid device controller 102 during operation or for caching data from the host 104.

Data retrieved from or stored to the main data store 106 may be stored in the primary cache 108, secondary cache 110, or both to improve the throughput of the hybrid data storage device 100 because the primary cache 108 and secondary cache 110 generally have faster access and retrieval times than the main data store 106, although generally with lower storage capacity. Although storing data on the primary cache 108 and secondary cache 110 may introduce data processing and transfer overhead, generally the faster media such as DRAM and NAND flash can significantly improve overall performance of the data storage device 100 under many conditions.

As used herein, the terms "primary" and "secondary" refer generally to an immediacy in time and priority to the hybrid device controller 102. For example, read/write requests from the host 104 may be processed by the primary cache 108 to facilitate completion of the host commands quickly. Data on the primary cache 108 may be moved to the secondary cache 110 or moved to the main data store 106 as the host sends new requests. In an implementation, the secondary cache 110 may be a read-only storage device because only data from the main data store 106 eligible for read operations by the host may be stored thereon. In this implementation, data marked for writing may be sent to the main data store 106, either directly from the hybrid device controller 102 or via the primary cache 108. In another implementation, the secondary cache 110 may be coherent with the main data store 106, meaning host data may only be stored on the secondary cache 110 if it is also stored on the main data store 106. When the secondary cache 110 is coherent with the main data store 106, certain operations such as garbage collection operations may be simplified because any valid data on the secondary cache 110 may be skipped or dropped from the secondary cache 110 due to its retrievability from the main data store 106 if necessary. The features disclosed herein for a secondary cache, such as secondary cache 110, may also be applicable to caches that are not "secondary" in relation to other caches, such as where a non-volatile cache is maintained in a parallel, non-hierarchical relation to a volative cache, or used without a volatile cache at all. The secondary cache 110 may optionally utilize volatile memory, such as DRAM, instead of non-volatile memory. In this disclosure, terms including "secondary cache," "read cache," "NAND flash storage media," and combinations thereof, are used interchangeably.

The hybrid data storage device 100 may include modules 112 to perform functions related to managing data in the main data store 106, in primary cache 108, in secondary cache 110, and in other parts of the hybrid data storage device 100 including to and from the host 104. The modules 112 may include any combination of custom logic circuitry, general purpose processors and controllers, firmware, and software. The modules 112 may include a history tracking module 114 to track operations affecting the hybrid data storage device 100 over time. For example, the history tracking module 114 may track the total number of program and/or erase operations performed on the primary cache 108, the secondary cache 110, and/or the main data store 106. The history tracking module 114 may track the time since the hybrid data storage device 100 was manufactured, the time the hybrid data storage device 100 was first used, a warranty period covering the hybrid data storage device 100, write amplification experienced by the primary cache 108, the secondary cache 110, and/or the main data store 106, host read/write requests received from hybrid device controller 102, etc.

An analysis module 116 is configured to determine one or more criteria associated with the hybrid data storage device 100. The criteria associated with the hybrid data storage device 100 may include a number of time periods remaining until the end of a warranty period, the number of allowable program/erase operations on the primary cache 108 and/or secondary cache 110 in a current time period, the total number of allowable program/erase operations on the primary cache 108 and/or secondary cache 110 until the end of a warranty period, the number of total allowable program/erase operations on the primary cache 108 and/or secondary cache 110 during the lifetime of the hybrid data storage device 100, the number of program/erase operations allowable during garbage collection in a current time period or any other time period, and any other operations, determinations, or calculations relating to the hybrid data storage device 100 disclosed herein. The analysis module 116 may be coupled to the history tracking module 114 to obtain any information needed or desirable for carrying out the aforementioned analysis.

A diagnostic module 118 is configured to determine one or more criteria associated with the performance of the hybrid data storage device 100. The criteria associated with the performance of the hybrid data storage device 100 may include write amplification per garbage collection unit during one or more garbage collection operations, write amplification associated with a dynamic level of over-provisioning on the main data store 106, the primary cache 108 and/or the secondary cache 110, and other operations consistent with the disclosure herein.

The hybrid device controller 102 may include various modules and/or subsystems including a flash management sub-system 122. The flash management sub-system 122 may perform a variety of operations and control parameters relating to the secondary cache 110. For example, the flash management sub-system 122 may handle eviction of data from the secondary cache 110, marking of data as pending eviction/stale/no longer pending eviction on the secondary cache 110, adjusting over-provisioning levels on the secondary cache 110, conducting garbage collection operations on the secondary cache 110, etc.

Program operations on a read cache, such as secondary cache 110, often occur when the hybrid device controller 102 promotes data from the main store 106 to the secondary cache 110. The hybrid device controller 102 may promote data to the secondary cache 110 because the secondary cache 110 may offer improved performance compared to the main data store 106 when responding to data access requests from the host 104. Programs to the secondary cache 110 also often occur during garbage collection operations. NAND flash media is composed of erasure blocks, each erasure block containing a number of pages to which data may be written. Although the pages in an erasure block may be written to individually, pages in an erasure block may only be erased if all the pages in the entire block are erased at the same time. Over time, erasure blocks may contain a mixture of valid data in some pages and stale data in other pages. A garbage collection operation may migrate the valid pages of data in a target erasure block to other erasure blocks before deleting the target erasure block, thus freeing space on the secondary cache 110. Migration of the valid data to other erasure blocks, however, requires programming the data to the other erasure blocks, thus incurring a programming cost that is not related to data sent from the host.

Erase operations on a read cache, such as secondary cache 110, also often occur during garbage collection operations when the pages of an erasure block are erased after valid data has been migrated to free the pages of the erasure block to accept valid data. Erase operations may also occur when the secondary cache 110 receives a new promotion from the host 104 when the secondary cache 110 is under a saturation condition. As explained in more detail below, data storage media may be over-provisioned, meaning a fraction of the physical capacity of the data storage media is dedicated to advertised space, i.e., the physical capacity available to the host 104, and the remainder of the physical space on the data storage media may be dedicated to over-provisioned space, which is reserved for use by the hybrid device controller 102 for use in storing data to minimize write amplification when conducting garbage collection operations or otherwise migrating valid data on the data storage media. When a data storage media is divided into over-provisioned space and advertised space, the media may be considered saturated when the advertised space is full or near full. If the secondary cache 110 is under a saturation condition and the hybrid device controller 102 promotes new data to the secondary cache 110, the hybrid device controller 102 may evict (i.e., delete) data on the secondary cache 110 to make space for the newly promoted data.

Due to the limited number of lifetime program/erase operations the secondary cache 110 is expected to be able to handle successfully, it may be desirable to be more selective with how the program/erase operations are spent over the life of the secondary cache 110 rather than promoting all eligible data and performing full migration of valid data during garbage collection operations. This concern may be increasingly important in view of potential downward revisions of the endurance estimate the secondary cache 110 in view of increased stringency of operating requirements or a need to lengthen the expected lifetime of the secondary cache 110 to minimize the probability that the secondary cache 110 will fail before other components of the hybrid data storage device 100, thus pushing the hybrid data storage device 100 into a failure mode. Failure of the hybrid data storage device 100 due to a failure of the secondary cache 110 is of increased importance if the secondary cache 110 fails before the end of a warranty period covering the hybrid data storage device 100, which may extend over a period of years, such as, for example, five years from the date of purchase of the hybrid data storage device 100.

A factor in managing program/erase operations on the hybrid data storage device 100 is write amplification (also referred to as "wear amplification"). Write amplification refers to the amount of data written in order to satisfy the amount of data requested to be written by the host 104. For example, in order to write 2 megabytes of host data to the secondary cache 110, 1 megabyte may also need to be written to the secondary cache 100 via internal garbage collection or other techniques to free up a sufficient number of erasure blocks on the cache to write the 2 megabytes of host data. Lower write amplification is preferable to higher write amplification because lower write amplification may extend the life of the secondary cache 110 and increase the performance of the hybrid data storage device 100 as a whole. Garbage collection operations may utilize techniques for minimizing write amplification such as operating on erasure blocks with the least amount of valid data to migrate first before operating on erasure blocks with greater amounts of valid data.

Over-provisioning is another concept relevant to managing program/erase operations on a secondary cache 110. Over-provisioning generally refers to the fraction of physical space on a storage media reserved for data needed for operations such as garbage collection or other operations carried out by the hybrid device controller 102 in contrast to the fraction of physical space exposed to the host 104. In other words, a storage media such as the secondary cache 110 may be capable of storing a greater amount of data than the amount of data that is advertised to a user and/or a user's host. The over-provisioning level generally has an inverse relationship with the write amplification expected to be experienced by the over-provisioned storage media because the over-provisioned space provides an opportunity to more efficiently carry out data migrations and other operations for storing and organizing data on the storage media. For example, if data has been overwritten by the host on a logical location, but still exists in a physical location on the storage media as stale data, over-provisioned space may be used by the hybrid device controller 102 to more efficiently handle garbage collection of the stale data. Moreover, the relationship between over-provisioning and write amplification need not be linear. In other words, increasing over-provisioning levels may decrease write amplification according to an exponential relationship. Losing over-provisioned space may therefore carry a high cost to the expected lifetime of the storage media due to increased write amplification.

Increasing over-provisioning conventionally decreases the amount of physical capacity exposed to the host, and thus the amount of data that the host may be able to access on the storage media. Increasing over-provisioning also reduces write amplification, and therefore the number of program operations needed on the storage media as well as reducing wear over time on a storage media. Since increasing over-provisioning also decreases the capacity of the storage media from the perspective of the host, a higher over-provisioning level generally will lead to a lower cache hit rate and therefore reduced performance of the storage media when used as a read cache. The ratio between over-provisioned space and advertised space may therefore be needed to find a balance between the rate at which garbage collection may be carried out efficiently and the responsiveness of the read cache to actual demand from the host for handling data access requests.

Tentative Self-eviction with Over-Provisioning

One manner of managing program/erase operations on a storage media such as secondary read cache 110 is tentative self-eviction of blocks on the cache with increased over-provisioning. A data cache may be divided into an advertised space portion and an over-provisioned portion. Instead of maintaining a fixed amount of free space for over-provisioning on a saturated secondary read cache 110 by evicting data when the cache receives a new promotion from the hybrid device controller 102 to make room for the newly promoted data, the flash management sub-system 122 may mark block(s) for tentative self-eviction. Throughout this disclosure, the terms pending self-eviction and tentative self-eviction are used interchangeably. Also the terms self-eviction and eviction are used interchangeably. When a block is marked for tentative self-eviction, the data in the block remains on the secondary read cache 110 until the final garbage collection operation for the garbage collection unit containing the block erases it. Until the garbage collection operation for the garbage collection unit containing the block erases a block marked for tentative self-eviction, the data in the block marked tentative self-eviction retains the valid data. If the secondary read cache 110 receives a data access request from the host 104 for the data in a block marked for tentative self-eviction, the secondary read cache 110 may respond to the host 104 with the requested data. If the secondary read cache 110 does receive a data access request from the host 104 for data in a block marked for tentative self-eviction, the flash management sub-system 122 may remove the tentative self-eviction marking from the requested erasure block. In this scenario, blocks not marked as tentative or pending self-eviction correspond to the advertised space portion of the cache and blocks that are marked as pending or tentative self-eviction correspond to the over-provisioned space portion of the cache. The number of blocks marked as pending self-eviction may be adjusted, thus changing the size of the over-provisioned portion of the data storage cache and also changing the size of the advertised portion of the data storage cache in relation to the number of blocks so marked. The ratio between over-provisioned space and advertised space may be dynamically changed depending on factors such as a write amplification limit condition or other factors.

In an implementation, erasure blocks may be marked as pending self-eviction using a bitmap. In another implementation, erasure blocks may be marked as pending self-eviction by borrowing a bit from the pointer or indices corresponding to the erasure block to be marked.

Under a scheme of marking erasure blocks for tentative self-eviction, it is no longer necessary to give up capacity on the secondary read cache 110 to achieve higher over-provisioning levels. In other words, over-provisioning need no longer be viewed as a fixed list of free blocks on the secondary read cache 110, but rather it may be viewed as controlling how soon a promoted block may be considered for self-eviction. This allows the secondary read cache 110 to be completely, or almost completely, consumed with valid data. Stated another way, with tentative self-eviction, logical capacity of the secondary read cache 110 may equal, or almost equal, physical capacity of the secondary read cache 110.

Marking erasure blocks as pending self-eviction also raises hit rates on the secondary read cache 110 for data access requests from the host 104 because more valid data may be retained for a longer period of time. In an implementation, a level of 50% over-provisioning is chosen for the secondary read cache 110. In other words, at a saturation level, 50% of the secondary read cache 110 is occupied with valid data not marked for self-eviction and 50% of the secondary read cache 110 is occupied with valid data marked for self-eviction. When the secondary read cache 110 is saturated and a promotion is received, data marked for tentative self-eviction may be erased to make room for the new promotion. Although at least some blocks must be left free to accept incoming promotions, the number of blocks containing valid data (marked for tentative self-eviction or not) approaches 100% of physical capacity of the storage media. In contrast to an over-provisioning scheme that does not use tentative self-eviction and maintains a fixed list of free blocks, more blocks are occupied by valid data and therefore are more likely to be the subject of a data access request by the host 104. Marking blocks for tentative self-eviction on the over-provisioned space rather than evicting the blocks to maintain free space on the over-provisioned space thus leads improved response times as erasure blocks in the pending self-eviction list are served to the host that would not have been available on the secondary read cache 110 if the secondary read cache 110 maintained a fixed list of free blocks as its over-provisioned space.

The specific data to be evicted may be determined in a number of ways including without limitation randomly, according to the least recently used (LRU) blocks, according to blocks that would free a sufficient amount of data to accept the new promotion, etc. In an implementation, evicting blocks marked for tentative self-eviction may be delayed to a final garbage collection operation on the secondary read cache 110. During a final garbage collection operation on the secondary read cache 110, blocks marked for tentative self-eviction may be included in the calculation to determine staleness for garbage collection purposes.

The over-provisioning level on the secondary read cache 110 may be determined dynamically. In an implementation, over-provisioning level may be adjusted higher depending on the number of allowable program/erase operations remaining during the remaining life of the hybrid data storage device 100 or during the remaining warranty time period of the hybrid data storage device 100. If there are a relatively larger number of remaining program/erase operations available to the hybrid data storage device 100, over-provisioning on the secondary read cache 110 may be lowered, thus increasing write amplification on the secondary read cache 110, but allowing for the retention of more valid data during garbage collection. On the other hand, if the remaining number of allowable program/erase operations on the secondary read cache 110 is relatively lower, over-provisioning on the secondary read cache 110 may be increased to reduce write amplification but at the cost of lower performance due to the retention of less valid data during garbage collection. Dynamically controlling over-provisioning on the secondary read cache 110 controls write amplification, and at best can achieve a write amplification of 1.0. To be most effective in managing total program/erase operations on the secondary read cache 110, tentative self-eviction with over-provisioning should be used together with the strategies of throttling promotions to the secondary read cache 110 and throttling garbage collection operations on the secondary read cache 110, as explained in more detail below.

Figure 2:
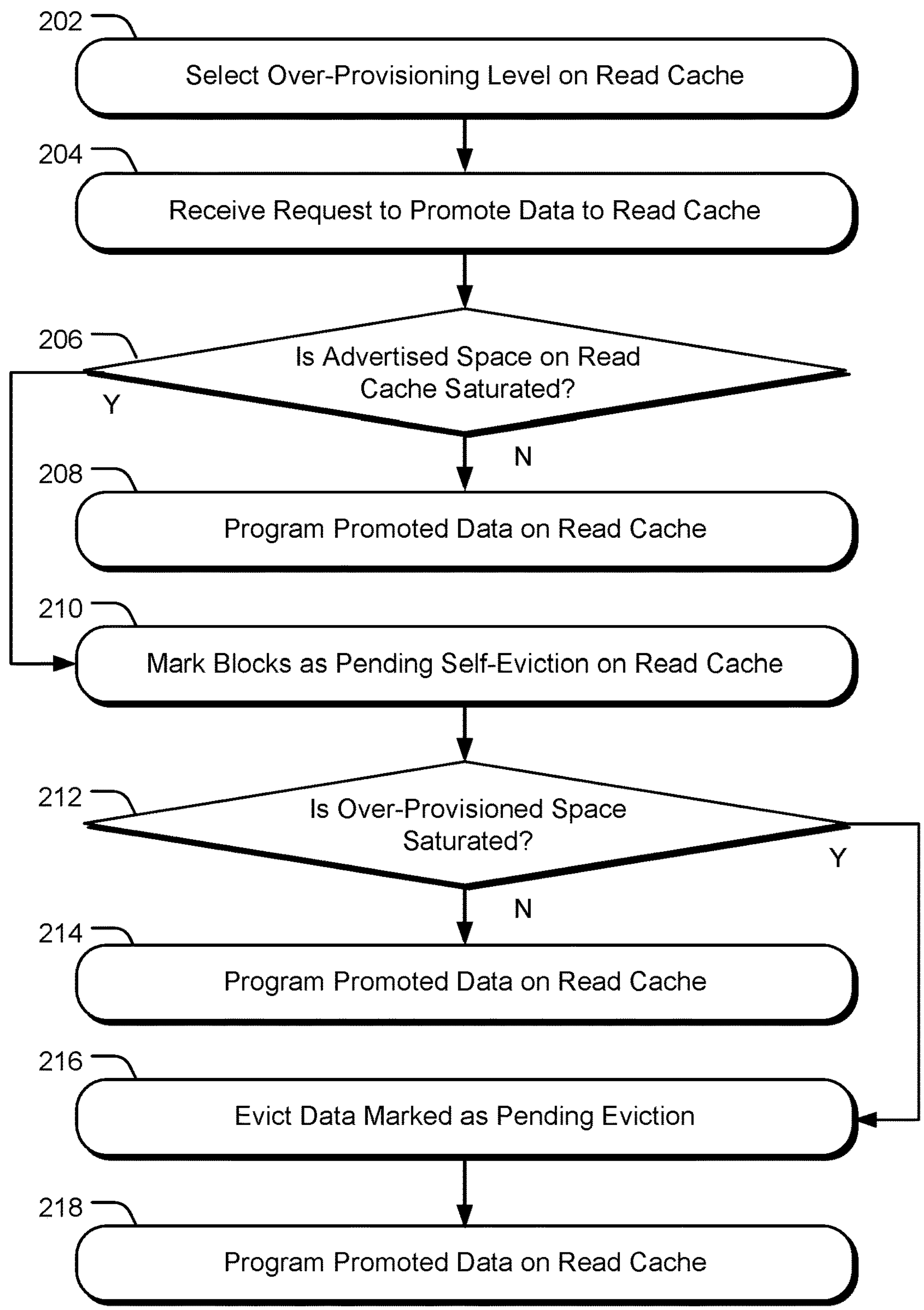
FIG. 2 illustrates example operations for managing program/erase operations in a hybrid data storage device using tentative self-eviction of data on a read cache.

FIG. 2 are example operations 200 for managing program/erase operations in a hybrid data storage device using tentative self-eviction of data on a read cache. Operation 202 is to select an over-provisioning level for the read cache. Since the example operations 200 rely on using over-provisioned space for erasure blocks marked as pending self-eviction rather than using over-provisioned space for maintaining a fixed number of free erasure blocks, operation 202 involves choosing how soon promoted data in the read cache will be considered for self-eviction. Regardless of the over-provisioning level chosen, near 100% of the capacity of the read cache will be used to store promoted data, whether that block is marked for tentative self-eviction or not. Some free blocks may be maintained for accepting newly promoted data, such that the entire physical capacity of the read cache may not contain promoted host data.

At operation 204, the read cache receives a request from a hybrid device controller to promote host data stored on a main data store. If the advertised space on the read cache is not saturated at operation 206, the data subject to the promotion request is programmed on the read cache at operation 208. If the advertised space on the read cache is saturated at operation 206, then enough blocks to accept the size of the promotion request data are selected on advertised space on the read cache and marked as pending self-eviction at operation 210.

If over-provisioned space on the read cache is not saturated at operation 212, then the promoted data is programmed to the read cache at operation 214. The programming operation of operation 214 is possible because the amount of data in advertised space on the read cache was reduced by marking blocks as pending eviction in operation 210. If over-provisioned space is saturated at operation 212, then enough blocks must be evicted from over-provisioned space to make room for the data subject to the promotion request to fit in over-provisioned space. The blocks selected for eviction in operation 216 may be selected randomly, according to the least recently used block, or according to another heuristic. After enough blocks have been evicted in operation 216 to free enough space to accommodate the data that is subject to the promotion request, the data that is subject to the promotion request is programmed in operation 218 to the read cache.

Figure 3:
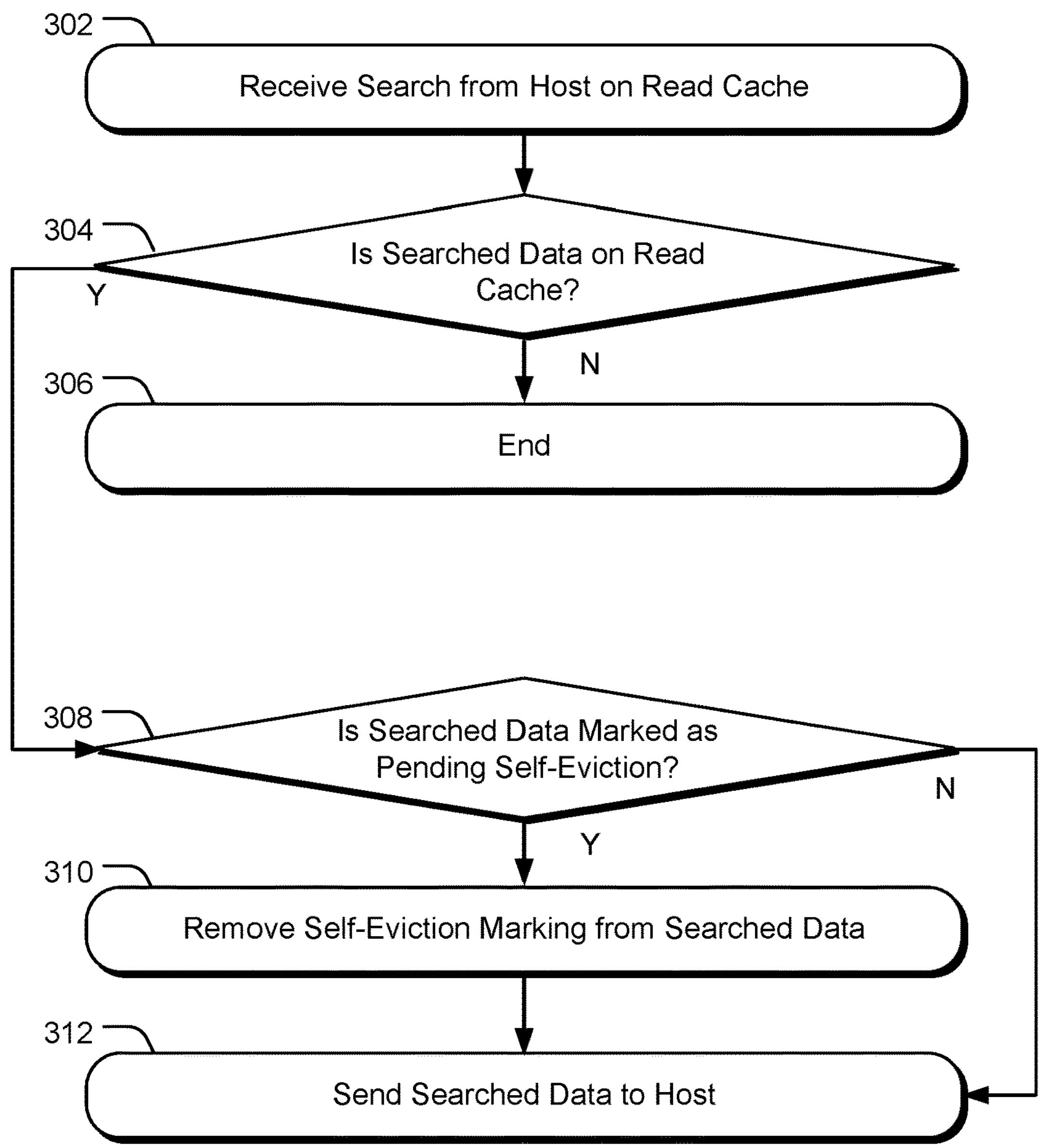
FIG. 3 illustrates example operations for managing program/erase operations in a hybrid data storage device using tentative self-eviction of data on a read cache.

FIG. 3 illustrates example operations 300 for managing program/erase operations in a hybrid data storage device using tentative self-eviction of data on a read cache. At a operation 302, a hybrid storage controller receives a data access request from a host for data. If the data subject to the data access request from the host is not on a read cache at operation 304, then the example operations 300 end at operation 306. If the data subject to the data access request from the host is on a read cache at operation 304, then the example operations proceed to operation 308. If the data subject to the data access request from the host is marked as pending self-eviction at operation 308, then the pending self-eviction flag may be removed from the data at operation 310, and the data subject to the data access request from the host is sent to the host at operation 312. If the data subject to the dis access request from the host is not marked as pending self-eviction at operation 308, then the data is sent to the host at operation 312.

Determining Remaining Allowable Program/Erase Operations

Another aspect of managing program/erase operations in a hybrid data storage device includes determining the total number of lifetime program/erase operations remaining on the secondary read cache with respect to the endurance estimate for the data storage medium comprising the read cache, and limiting additional program/erase operations over a time period such that the hybrid data storage device does not perform more program/erase operations on the secondary read cache than the cache's estimated endurance level. In an implementation, program/erase operations on the secondary read cache are limited to less than the endurance level of the read cache during a warranty period covering the hybrid data storage device.

The secondary read cache may be associated with an endurance level corresponding to a number of program/erase operations that the secondary read cache may be expected to be able to successfully handle before failure. The manufacturer of the secondary read cache may provide an endurance rating for the secondary read cache storage media that may be used to provide for the purposes described herein. Alternatively, or additionally, an endurance rating for the secondary read cache storage media may be determined specifically under conditions for use as a read cache. Considerations affecting the endurance level of the storage media for use as a secondary read cache may differ significantly from considerations relied upon to determine an endurance level of the storage media for general use. For example, the secondary read cache may be coherent with a main data store, meaning that data stored on the secondary read cache is also available on the main data store. Loss or corruption of data on the storage media may therefore be more tolerable when the storage media is used as a read cache than in general use because any lost data may be retrieved from the main data store if necessary. Other factors that may be relied upon to determine the endurance level of the storage media used for the secondary read cache include error rate, retention requirements, program/erase operation failures, bit error rate, operating temperature, etc.

In an implementation, the endurance level of the data storage media used for the secondary read cache may be determined dynamically, and revised over the course of the life of the storage media. For example, if a detected operating temperature of the storage media used for the secondary read cache is significantly higher than an expected range over the life of the device, the endurance of the secondary read cache may be revised downward. On the other hand, if detected bit error rate and program/erase operation failure rates remain lower than expected over the life of the device, the endurance of the secondary read cache may be revised upward.

It may be important for the hybrid data storage device to limit the total number of program/erase operations on the secondary read cache over the life of the hybrid data storage device to an amount less than the endurance level of the storage media used for the secondary read cache because failure of the storage media used for the secondary read cache may cause the hybrid data storage device to enter a failure mode.

The hybrid data storage device may divide a remaining lifetime of the device into a number of time periods. In an implementation, the time periods are equal time periods, such as 5, 10, 15 seconds, etc., and the remaining lifetime of the hybrid data storage device extends over a warranty period covering the hybrid data storage device. In another implementation, the time periods are unequal. In yet another implementation, the length of the time periods is variable, and may be changed over the life of the hybrid data storage device.

After the remaining lifetime of the hybrid data storage device has been divided into time periods, a maximum number of program/erase operations per time period may be computed by dividing the remaining lifetime program/erase operations by the remaining time periods, assuming the time periods are all of equal value. Referring to FIG. 1, the history tracking module 114 may store an endurance value associated with the secondary read cache and a program/erase operation counter corresponding with the total number of program/erase operations carried out on the secondary read cache to date over the life of the hybrid data storage device. The history tracking module 114 may increment the program/erase operation counter for each program/erase operation performed on the secondary read cache. The analysis module 116 may compute the maximum number of allowable program/erase operations on the secondary cache per time period by taking the difference between the total number of program/erase operations stored on the program/erase operation counter and the endurance value for the secondary cache stored on the history tracking module 114 and dividing that value by the number of remaining time periods.

Throttling Promotions to the Read Cache

One aspect of the present disclosure involves limiting the number of promotions to the secondary read cache to a number less than the maximum number of allowable program/erase operations in each time period over the life of the hybrid data storage device. Throttling promotions to the secondary read cache may be done in a number of ways. In one implementation, promotions to the secondary read cache may be accepted until the maximum value is reached, and any subsequent promotions may be denied until the beginning of the next time period. In another implementation, the stringency of the requirements for a promotion to the secondary read cache may become more stringent as the number of promotions during a time period approaches the maximum number of allowable promotions for that time period. One way of increasing the stringency of the requirements for a promotion to the secondary read cache is to increase the read hotness threshold for the data considered for promotion. In this example, promotions would be less stringent during the early part of a time period, and, depending on the number of promotions encountered during the time period, would become more stringent as the time period progresses. An advantage of increasing the stringency requirements is that data with a high read hotness threshold would be able to be promoted near the end of a time period as the number of program/erase operations approaches the maximum number of allowable program/erase operations over the time period. On the other hand, if the stringency requirements for a promotion remain constant throughout the time period, promotions with lower read hotness thresholds may be accepted until the limit is reached, and then promotions with higher read hotness thresholds may be denied once the limit is reached for that time period.

Figure 4:
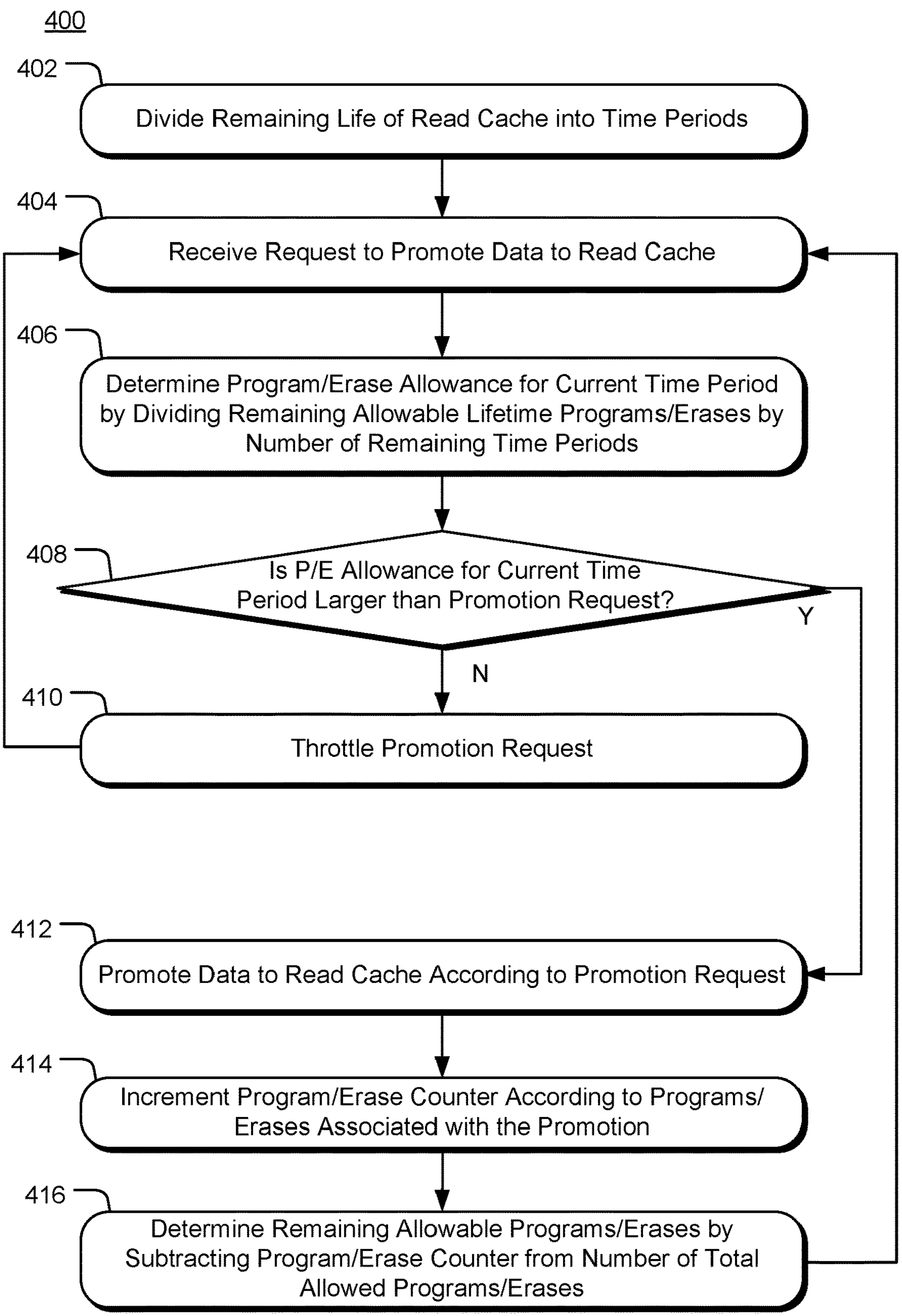
FIG. 4 illustrates example operations for managing program/erase operations in a hybrid data storage device by throttling promotions to a read cache.

FIG. 4 illustrates example operations 400 for managing program/erase operations in a hybrid data storage device by throttling promotions to a read cache. Operation 402 is an operation to divide the remaining life of the secondary read cache into time periods. In an implementation, the time periods may be equal time periods. Each time periods may be, for example, 5, 10, 15, etc. seconds long. In another implementation, the time periods may be unequal in length. Operation 404 is receiving a promotion request to promote data to a read cache during one of the time periods. The data that is the subject of the promotion request may reside on a main data store, and the request may be to promote the data from the main data store to the read cache to be available for responding to data access requests from the host to read the data that is the subject of the promotion request.

Before it can be determined whether the promotion request should be accepted, the hybrid data storage device may determine the program/erase operation allowance for the time period in which the promotion request was received at operation 406. Operation 406 involves dividing the remaining allowable lifetime program/erase operations by the number of remaining time periods. In an implementation, an analysis module may perform the calculation of operation 406. The number of remaining allowable lifetime program/erase operations may be calculated by retrieving an endurance level of the read cache and subtracting the number of total program/erase operations performed on the read cache up to that time. In an implementation, a history tracking module may retain an endurance level associated with the read cache. The history tracking module may also maintain a counter to track the total lifetime program/erase operations to date on the read cache. The history tracking module may further retain data regarding the amount of time the hybrid data storage device has been in operation and a time period or date which represents the end of a warranty period for the hybrid data storage device. In an implementation, an analysis module may retrieve the necessary data from the history tracking module and perform the calculation of operation 406.

If the maximum number of program/erase operations for the time period in which the promotion request was received would be exceeded by accepting the promotion request at operation 408, then the hybrid data storage device may throttle the promotion request at operation 410. In an implementation, throttling the promotion request at operation 410 includes denying the request. In another implementation, throttling the promotion request at operation 410 includes increasing the stringency for accepting promotion requests, such as, for example, increasing a read hotness threshold for promotion requests. If the promotion request received at operation 404 would exceed the maximum allowable program/erase operations for the time period in which it was received, but the promotion request received at operation 404 nonetheless satisfies an increased read hotness threshold, the hybrid data storage device may accept the promotion request received at operation 404 even though doing so exceeds the maximum allowable program/erase operations for that time period. Accepting a promotion request even though it will exceed the maximum allowable program/erase operations for a time period may be acceptable if the read hotness level is high enough because to do so is essentially "borrowing" from the program/erase operation budget of future time periods. Exceeding a maximum allowable program/erase operation limit for a time period to accept a promotion with a high read hotness value may be preferable to rejecting that promotion in favor of another promotion in a future time period with a relatively lower read hotness value. If the hybrid data storage device exceeds a maximum allowable program/erase operation limit for a time period, then the next time the hybrid data storage device calculates the maximum allowable program/erase operations for each time period, the future time periods will be assigned a lower number of maximum allowable program/erase operations due to exceeding the maximum allowable program/erase operations in the earlier time period.

If the promotion request received in operation 404 is accepted by the hybrid data storage device, then the data that is the subject of the promotion request may be promoted to the read cache in operation 412. After data has been promoted to the read cache as operation 412, a total lifetime program/erase operation counter may be incremented at operation 414 to reflect the number of program/erase operations performed to promote the data in operation 412. In an implementation, a history tracking module maintains a counter to track total lifetime program/erase operations on the read cache. A operation 416 is determining the remaining allowable program/erase operations on the read cache by subtracting the value of the total lifetime program/erase counter from the number of total allowed program/erase operations, i.e., the endurance, of the read cache. The operations 400 then return to operation 404 to receive the request for promotion of data to the read cache.

Throttling Garbage Collection Operations on the Read Cache

Another aspect of the present disclosure is managing program/erase operations by throttling garbage collection operations on a read cache. If the read cache is coherent with the main data store, i.e., any data on the read cache is also present on the main data store, then it is possible to skip migration of valid data during garbage collection operations on the read cache without losing valid data on the hybrid data storage device as a whole. For example, if an erasure block on the read cache contains one page of valid data and the remaining pages are consumed with stale data, then that erasure block could be erased during a garbage collection operation without migrating the page of valid data to another block, i.e., the page of valid data was "skipped." If the host makes a data access request for the data that was contained in the skipped page, then the hybrid data storage device may either promote the data again to the read cache or it may respond to the host's data access request with the request data directly from the main data store.

Before beginning a garbage collection operation, the hybrid data storage device may compute a write amplification value associated with the garbage collection operation if all valid data is to be migrated. If the expected write amplification value is above a write amplification limit or if the program/erase operations associated with migrating the valid data during the garbage collection operation exceed or approach the maximum allowable number of program/erase operations allowable in the time period in which the garbage collection operation would occur, then the hybrid data storage device may skip migration of some or all valid data during the garbage collection operation. In an implementation, the valid data to be skipped during the garbage collection operation may be chosen randomly. In another implementation, the valid data to be skipped may be chosen based on a heuristic, including without limitation, based on least recently used data or the coldness of the data. In an implementation, an analysis module on the hybrid data storage device may include an access pattern tracker to determine the coldness of data on the read cache.

Consideration of skipping migration of valid data on the read cache during garbage collection operations may be desirable if data being evicted has had a chance to remain in the read cache long enough that a sufficient history may be built to be able to decide whether it is advantageous to migrate or skip the data. Although it is possible that evicted valid data may need to be re-written to the read cache in the future, this risk can be minimized by migrating valid data until it has remained on the read cache longer than a threshold period of time such that an informed determination may be made.

Skipping migration of valid data during garbage collection operations may control write amplification, and, in a best-case scenario, may achieve a write amplification of 1 if migration of valid data is skipped aggressively. In another implementation, there is a write amplification limit value for garbage collection operations, and valid data may be migrated up until the point that the write amplification limit for that garbage collection operation has been reached. Any valid data that has not been migrated after the write amplification limit has been reached for a particular garbage collection operation may be skipped. In an implementation, a write amplification limit of 2.0 may be set for individual garbage collection operations, such that any garbage collection operations that would have exceeded a write amplification of 2.0 are capped by skipping migration of any valid data after the write amplification limit is reached. In another implementation, the write amplification limit value depends on the over-provisioning level of the read cache. The higher the over-provisioning level of the read cache, the lower write amplification may be expected to be, and vice-versa. Skipping migration of valid data during garbage collection may allow actual write amplification to be consistent with the write amplification expected based on the over-provisioning level of the read cache.

Figure 5:
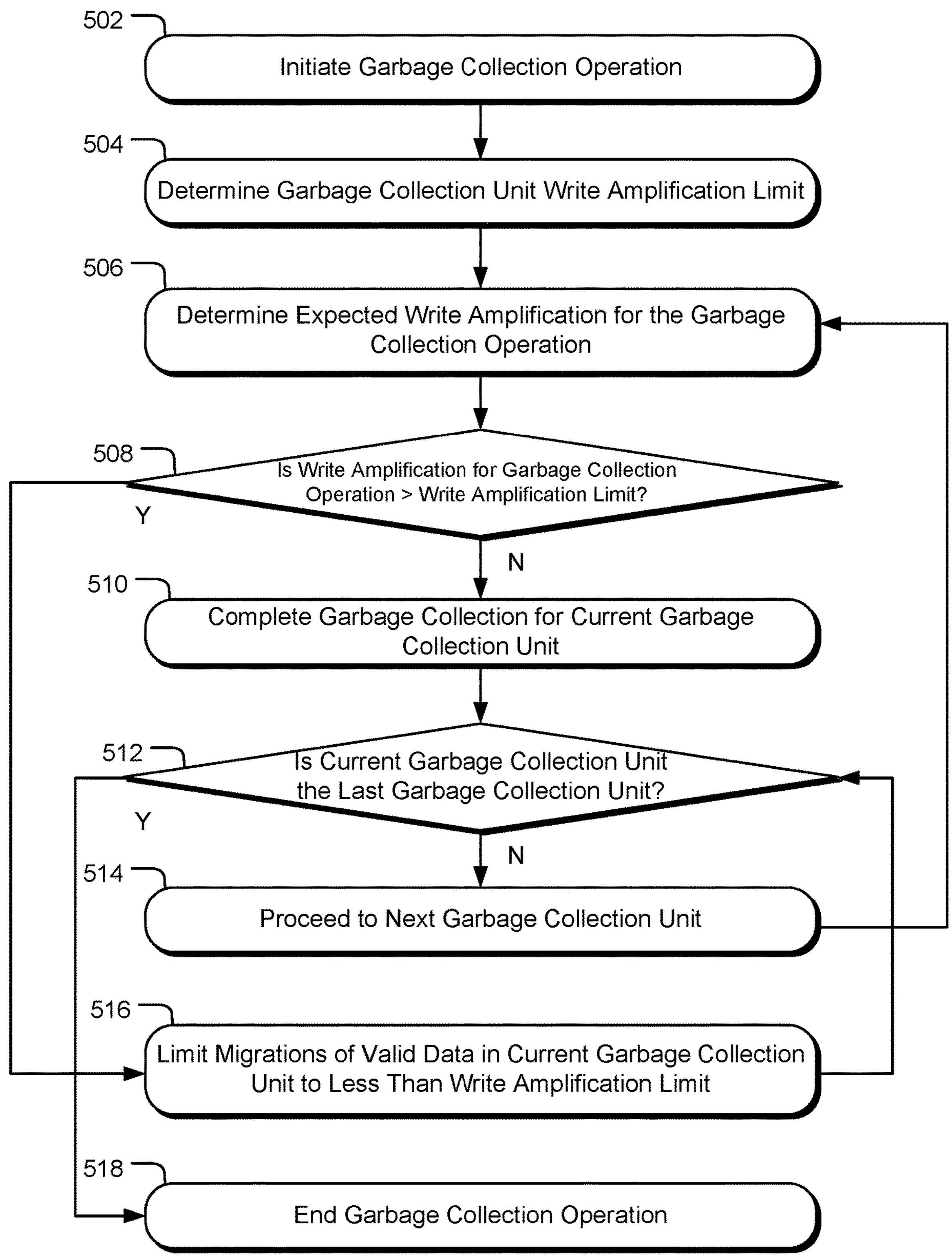
FIG. 5 illustrates example operations for managing program/erase operations in a hybrid data storage device by throttling garbage collection operations on a read cache.

FIG. 5 illustrates example operations for managing program/erase operations in a hybrid data storage device by throttling garbage collection operations on a read cache.

Operation 502 is to initiate a garbage collection operation. The garbage collection operation may include a part or all of a read cache or include a garbage collection unit on a read cache. Operation 504 is to determine a garbage collection write amplification limit. The garbage collection write amplification limit may apply to the entire garbage collection operation, the read cache as a whole, or a garbage collection unit on the read cache. The garbage collection write amplification limit may be determined dynamically, including without limitation, based on the over-provisioning level of the read cache, based on the allowable number of program/erase operations available for use during the time period in which the garbage collection operation will occur, etc. Alternatively, the garbage collection write amplification limit may a predetermined value.

Operation 506 determines expected write amplification for the garbage collection operation. In an implementation, operation 506 determines the expected write amplification for the garbage collection operation if all valid data is to be migrated, and no valid data is to be migrated. In another implementation, operation 506 determines a write amplification for the garbage collection operation if only some of the valid data is migrated during the garbage collection operation. If the expected write amplification for the garbage collection operation is greater than the write amplification limit, then operation 516 limits migrations of valid data in the garbage collection unit to an amount that will limit associated write amplification to less than the write amplification limit. The operation 516 may determine the valid data to be skipped randomly, or according to a heuristic including without limitation, coldest data first, least recently used, etc. If the write amplification for the garbage collection operation is not greater than the write amplification limit, then operation 510 completes the garbage collection operation for the current garbage collection unit. If the current garbage collection unit is the last garbage collection unit in the garbage collection operation, then the operations 500 proceed to the next garbage collection unit at operation 514. If the current garbage collection unit is not the last garbage collection unit in the garbage collection operation, then the operations 500 end at operation 518.

Figure 6:
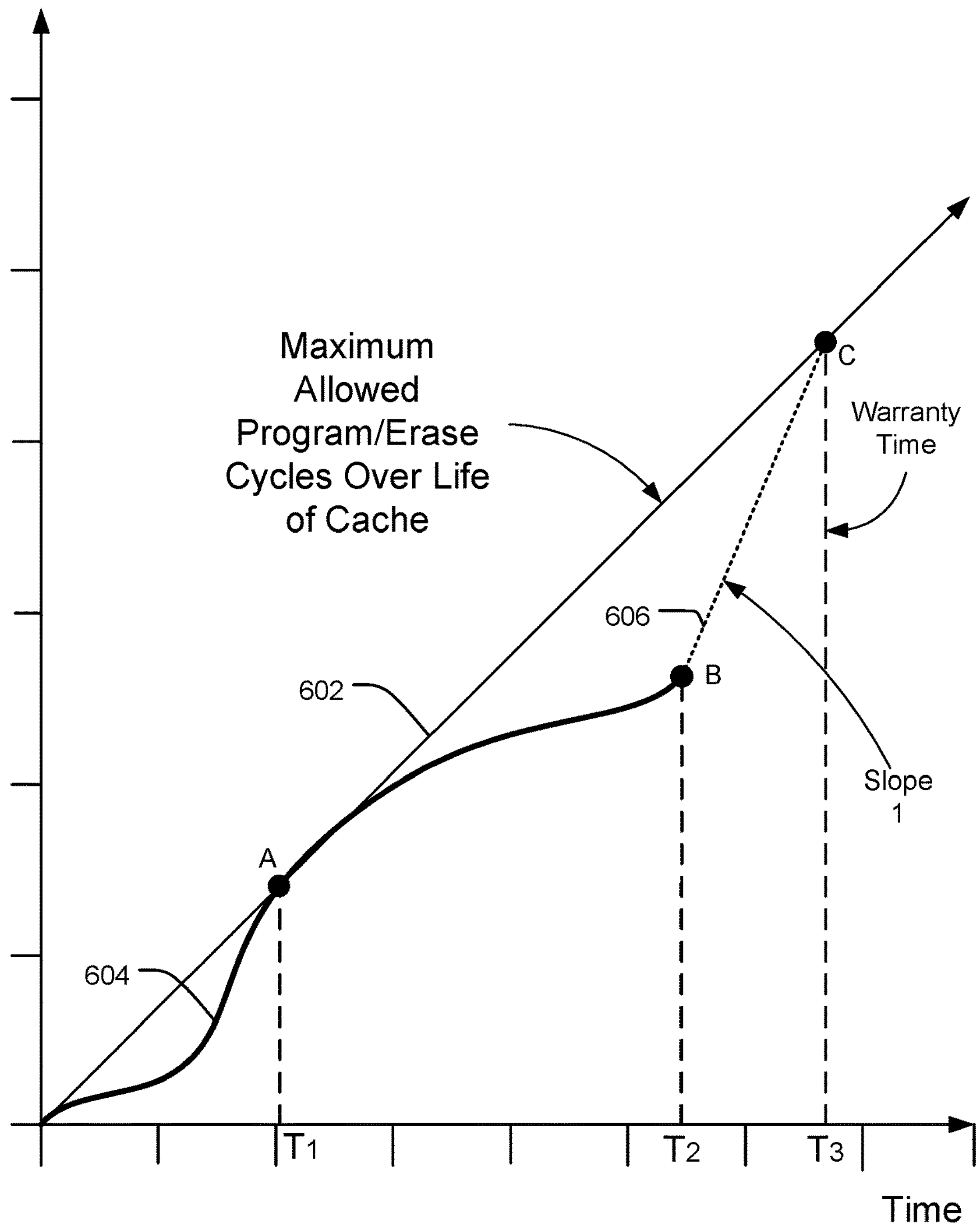
FIG. 6 is an example plot of total cumulative program/erase operations against time on a read cache in a hybrid data storage device.

FIG. 6 is a plot 600 of total cumulative program/erase operations against time on a read cache in a hybrid data storage device. Line 602 represents a constant consumption of program/erase operations over the lift of a read cache. In other words, if each time period in the series of time periods from the beginning of the hybrid data storage device's life until the end of a warranty period (represented by time $T_3$), consumed the maximum allowed program/erase operations, then a plot of program/erase consumption would follow line 602.

Line 604 represents an example plot of program/erase operation consumption for a read cache over time. At time T1, the number of lifetime program/erase operations consumed by the read cache is represented by the value of line 604 at point A. Point A is on line 602 representing the maximum budgeted program/erase operations per time period. At point A, therefore, there are no excess program/erase operations available, and no additional program/erase operations may be consumed without exceeding line 602. At time $T_1$, The hybrid data storage device may reduce the rate at which program/erase operations are being consumed in a number of ways. For example, over-provisioning may be increased on the read cache to decrease the amount of time data may remain on the cache before it is considered for self-eviction with the benefit of fewer program/erase operations due to decreased write amplification. Alternatively, or additionally, promotions may be made more restrictive by increasing the read hotness threshold needed for a promotion such that fewer host promotions are made per time period between time $T_1$ and time $T_3$. Alternatively, or additionally, garbage collection operations may skip migration of more valid data, thus burning fewer program/erase operations due to decreased write amplification.

At time $T_2$, the number of total lifetime program/erase operations consumed by the read cache is represented by the value of line 604 at point B. Point B is below line 602 representing maximum burning of program/erase operations. At Point B, therefore, more program/erase operations may be consumed per time period than would be consumed if the program/erase operations were consumed at a constant rate. In other words, line 606 with slope 1 represents a new maximum rate at which program/erase operations may be consumed between time $T_1$ and time $T_3$. Additional program/erase operations may be made possible in a variety of ways. For example, over-provisioning may be decreased on the read cache to increase the amount of time data may remain on the cache before it is considered for self-eviction at the cost of greater program/erase operations due to increased write amplification. Alternatively, or additionally, promotions may be made less restrictive by reducing the read hotness threshold needed for a promotion such that more host promotions are made per time period between time $T_1$ and time $T_3$. Alternatively, or additionally, garbage collection operations may migrate more valid data, thus burning program/erase operations due to increased write amplification.

The plot of FIG. 6 illustrates that the techniques described herein provide adjustable parameters to manage program/erase operations on a hybrid data storage device. The adjustable parameters include modification of over-provisioning levels on the secondary read cache, throttling promotions, and throttling garbage collection operations. These parameters may be adjusted dynamically during the life of the hybrid data storage device as shown in the plot of FIG. 6 to trade performance for extending the life of the read cache. For example, if a hybrid data storage device encounters low levels of use during the early years of operation, the parameters may be adjusted to provide improved performance over the remainder of the device's life at the cost of increase program/erase operations because the device is not in danger of exceeding the endurance limit of the read cache. On the other hand, if a hybrid data storage device encounters heavy use during its early years of life, the parameters may be adjusted to reduce risk of read cache failure due to excessive program/erase operations at the cost of reduced performance.

The implementations described herein are implemented as logical operations in one or more computer systems. The logical operations may be implemented (1) as a sequence of processor-implemented operations executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, operations, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:

dividing a remaining lifetime of a data storage cache into a series of time periods;

receiving a write request from a storage controller to write one or more clusters to the data storage cache during a first time period in the series of time periods, the write request being received as part of a request to perform a garbage collection operation on the data storage cache;

determining a maximum number of write operations allowable on the data storage cache during the first time period; and declining the write request if allowing the write request would exceed the maximum number of write operations allowable on the data storage cache during the first time period by skipping migration of valid data on the data storage cache during garbage collection operations, wherein the valid data for which migration is skipped is chosen from valid data that has remained on the data storage cache longer than a threshold period of time.

2. The method of claim 1, further comprising allowing the write request if allowing the write request would not exceed the maximum number of write operations permitted on the storage cache during the first time period.

3. The method of claim 1, wherein determining a maximum number of write operations allowable on the data storage cache during the first time period comprises:

dividing a number of remaining allowable write operations over the remaining lifetime of the storage cache by a number of periods remaining in the series of time periods.

4. The method of claim 3, wherein the number of remaining allowable write operations over the remaining lifetime of the storage cache is determined by the difference between an expected lifetime write operations endurance of the storage device minus a number of write operations already performed on the storage device over the life of the storage device.

5. The method of claim 4, wherein the expected lifetime write operations endurance of the storage cache is determined based on at least one of: a write-related failure, a data retention requirement, an operating temperature, and a bit error rate.

6. The method of claim 1, wherein the valid data for which migration is skipped is chosen from the valid data that has remained on the data storage cache longer than the predetermined threshold based on a heuristic.

7. The method of claim 6, wherein the heuristic is based on a history built for the valid data that has remained on the data storage cache longer than the predetermined threshold.

8. A method comprising:

dividing a remaining lifetime of a data storage cache into a series of time periods;

receiving a write request from a storage controller to write one or more clusters to the data storage cache during a first time period in the series of time periods, the write request being received as part of a request to perform a garbage collection operation on the data storage cache;

determining a maximum number of write operations allowable on the data storage cache during the first time period;

declining the write request if allowing the write request would exceed the maximum number of write operations allowable on the data storage cache during the first time period by skipping migration of valid data on the data storage cache during garbage collection operations, wherein the valid data for which migration is skipped is chosen from valid data that has remained on the data storage cache longer than a threshold period of time; and selecting one or more blocks including one or more pages of valid data from the valid data that has remained on the data storage cache longer than the threshold period of time for erasure during the garbage collection operation if a write amplification of the garbage collection operation exceeds a write amplification limit condition without migrating the one or more pages of valid data.

9. The method of claim 8, wherein the one or more blocks including one or more pages of valid data selected for erasure during a garbage collection operation is sufficient to limit the write amplification of the garbage collection operation to less than the write amplification limit condition.

10. The method of claim 8, wherein the one or more blocks including one or more pages of valid data selected for erasure from the valid data that has remained on the data storage cache longer than the threshold period of time are selected randomly.

11. The method of claim 8, wherein the one or more blocks including one or more pages of valid data selected for erasure from the valid data that has remained on the data storage cache longer than the threshold period of time are selected according to the Least Recently Used (LRU) block.

12. A data storage device comprising:

a data storage medium including a main data store and a data storage cache; and a data storage cache management sub-system configured to write clusters of data from the main data store to the data storage cache, the data storage cache management sub-system further configured to limit write operations on the data storage cache by skipping migration of valid data on the data storage cache during garbage collection operations, wherein the valid data for which migration is skipped is chosen from valid data has remained on the data storage cache longer than a threshold period of time.

13. The data storage device of claim 12, wherein the data storage cache management sub-system is further configured to limit write operations on the data storage cache by denying promotion requests from a main data store to the data storage cache.

14. The data storage device of claim 12, wherein the data storage cache management sub-system is further configured to limit write operations on the data storage cache by modifying an over-provisioning level of the storage cache.

15. The data storage device of claim 12, wherein the data storage cache is coherent with the main store.

16. The data storage device of claim 12, wherein the data storage cache management sub-system is configured to adjust the expected lifetime write operations endurance on the data storage cache based on one or more of: write failures, a data retention requirement, operating temperatures, and bit error rate.

17. The data storage device of claim 12, wherein the valid data for which migration is skipped is chosen from the valid data that has remained on the data storage cache longer than the predetermined threshold based on a heuristic.

18. The method of claim 17, wherein the heuristic is based on a history built for the valid data that has remained on the data storage cache longer than the predetermined threshold.

* * * * *